United States Patent [19]

Jansma et al.

[11] Patent Number: 5,401,810

[45] Date of Patent: Mar. 28, 1995

[54] STRENGTH RESINS FOR PAPER

[75] Inventors: Roger H. Jansma, Park Forest; A. James Begala, Naperville; Gary S. Furman, St. Charles, all of Ill.

[73] Assignee: Nalco Chemical Company, Naperville, Ill.

[21] Appl. No.: 210,408

[22] Filed: Mar. 18, 1994

Related U.S. Application Data

[63] Continuation of Ser. No. 837,970, Feb. 20, 1992, abandoned.

[51] Int. Cl.⁶ .............................. C08F 8/28; C08F 8/30
[52] U.S. Cl. ................................ 525/385; 525/329.4; 526/303.1; 526/304; 526/307.1; 526/307.5
[58] Field of Search ......................... 525/385, 329.4; 526/304, 307.1, 307.5

[56] References Cited

U.S. PATENT DOCUMENTS

| | | | |
|---|---|---|---|
| 3,556,932 | 7/1968 | Coscia | 162/166 |
| 4,508,594 | 4/1985 | Jansma et al. . | |
| 4,603,176 | 7/1986 | Bjorkquist et al. . | |
| 4,605,718 | 8/1986 | Jansma et al. . | |
| 4,675,394 | 6/1987 | Solarek et al. . | |
| 4,703,116 | 10/1987 | Solarek et al. . | |
| 4,731,162 | 3/1988 | Solarek et al. . | |
| 4,851,577 | 7/1989 | Chastrette | 564/208 |
| 4,918,139 | 4/1990 | Cuirassier | 524/813 |
| 4,954,538 | 9/1990 | Dauplaise et al. . | |
| 5,008,344 | 4/1991 | Bjorkquist . | |

*Primary Examiner*—Fred Zitomer
*Attorney, Agent, or Firm*—Robert A. Miller

[57] ABSTRACT

There is provided a strength resin polymer for papermaking that has pendant alpha-hydroxy acetal substituents to (N-alkyl)($C_{1-2}$ alkyl)acrylamide mer units. There also is provided a process for preparation of such resin polymer by adduction of a pre-existing polymer, or the monomer precursors thereto, with an acetal-aldehyde reactant under alkaline conditions. There is provided such strength resin polymer in the form of a fluid liquid system, for instance a fluid solution or a fluid oil-continuous water-in-oil emulsion, particularly when such a system has a high concentration of resin polymer. There is provided activated polymer versions of certain of such resin polymers and paper compositions containing such activated polymer. There is also provided papermaking processes including the step of activating such resin polymer.

13 Claims, No Drawings

STRENGTH RESINS FOR PAPER

This is a continuation of application Ser. No. 07/837,970, filed Feb. 2, 1992, now abandoned.

TECHNICAL FIELD OF THE INVENTION

The present invention is in the technical field of strength resin additives for papermaking, processes for preparing strength resins and the use of strength resins in papermaking processes.

BACKGROUND OF THE INVENTION

Strength resins are polymers generally added at the wet end of a papermaking process to the cellulosic slurry, prior to the formation of the paper mat or sheet, to improve the strength characteristics of the paper product.

U.S. Pat. No. 3,556,932, Coscia et al., which is incorporated hereinto by reference, describes ionic-hydrophilic vinylamide strength resin polymers for paper which have —CHOHCHO substituents and which thermoset or cure rapidly at common paper-making temperatures (190°–250° F. at the drying section, although 70°–90° F. is stated to be sufficient) at about a neutral pH (pH 6 to 7) to impart excellent wet strength, and which also cure to impart very satisfactory wet strength over a broad pH range of pH 4 to 8. These polymers may be self-substantive cationic polymers or anionic polymers that are deposited on fibers by the use of alum, a technique well known in the field. Paper having wet strength resulting from the use of such polymers advantageously loses a part of such wet strength when soaked in water for a moderate time period, and loses substantially all such wet strength when soaked in alkaline water. The vinylamide units provide the sites to which the —CHOHCHO groups attach by reaction with glyoxal. The vinylamide units should comprise at least 10 mole percent of the starting material polymer, up to 50 or 75 or higher mole percent. Such polymer may be a water-soluble acrylamide/diallyldimethyl ammonium chloride copolymer, or terpolymer with vinyl acetate, and molecular weights less than 25,000 are preferred because of storage stability when reacted with glyoxal. The reaction does not go to completion. If 25 mole percent of glyoxal (based on acrylamide mer units) and a 95:5 molar ratio acrylamide:diallyldimethyl ammonium chloride polymer are used, a polymer of somewhat less than 12.5 mole percent aldehyde functionality is produced. The highest glyoxal:amide ratio for preferred wet strength is stated to be 0.20:1. It is reported that dilute aqueous solutions of the reaction product are initially clear but become hazy upon standing at room or higher temperatures The highest mole percent of —CHOHCHO substituents incorporated into mer units in this patent's working examples is about 12 or 14 mole percent.

As noted in U.S. Pat. No. 4,954,538, Dauplaise et al., issued Sept. 4, 1990, which is incorporated hereinto be reference, the solutions provided by the teachings of U.S. Pat. No. 3,556,932 above have limited shelf-lives due to the crosslinking. Commercial products provided at 10% solids will gel within 8 days at room temperature.

U.S. Pat. No. 4,603,176, Bjorkquist et al., issued Jul. 29, 1986, which is incorporated hereinto by reference, is directed to temporary wet strength resin polymers also having glyoxal-capped acrylamide polymers. The resins are described as providing to paper products, such as paper towels and tissues, good initial wet strength for the intended use of such products, and also as being advantageously subject to time dependent wet tensile decay in a septic system or the like. The choice method for improving wet strength in the papermaking field has been to supplement the formation of hydrogen bonds, which are believed to provide dry strength, with the formation of chemical bonds incapable of being broken by water, during the paper product formation process. Such resin polymers are broadly described as comprised of from 5 to 95 mole percent of a polar, non-nucleophilic mer unit, from 3 to 65 mole percent of a ($C_{1-4}$ alkyl or halo)acrylamide mer unit, from 1 to 30 mole percent of a glyoxal capped ($C_{1-4}$ alkyl or halo)acrylamide mer unit, and from 1 to 10 mole percent of a hydrophilic cationic mer unit. A glyoxal capped acrylamide mer unit is an acrylamide unit that is substituted at the amide nitrogen with alpha-hydroxy acetaldehyde. The stated belief is that such polymer develops wet strength through the formation of both hemiacetal bonds (co-crosslinking between cellulose hydroxyl groups and resin aldehyde groups) and amidol bonds (homo-crosslinking between primary amide groups of one resin polymer and the aldehyde groups of another resin polymer), and that the rate of wet tensile decay in paper products will be proportional to the relative number of these two types of bonds. The hemiacetal bonds contribute to a rate of decay in paper products that is believed to be orders of magnitude faster than amidol bonds at a neutral pH. The relative number of amidol bonds can be reduced by reducing the number of primary amide groups in the resin polymer (and increasing the proportion of the non-nucleophilic mer units, which reduces the number of nucleophilic sites on the polymer backbone). The resin polymer is first formed with a hydrophilic, nucleophilic monomer which serves as the site of attachment for glyoxal, which mer unit is generally a primary vinylamide, preferrably (meth)acrylamide, which when partially capped with gloxal in combination satisfies two mer unit categories of the resin polymer. For instance, a polymer is formed first of a non-nucleophilic monomer, a (meth)acrylamide, and a cationic monomer, and then it is reacted with glyoxal, which attaches at the primary amide nitrogen and caps a portion of the (meth)acrylamide. Best results are described as around 35% tensile decay at 5 minutes and around 65% at 30 minutes after saturation rewetting. The glyoxal capping reaction, as illustrated in the working examples, requires a 5% buffered solution of the initial polymer to be reacted with the glyoxal for a 24 hour reaction period at 30° C. The polymer resins illustrated in this U.S. Pat. No. 4,603,176 contain only from about 3 to 15 mole percent of capped acrylamide units and have molecular weights of from about 12,000 to about 63,000.

The object of the present invention is to provide a process or method of preparing a strength resin polymer that remains stable during storage and/or transport time periods, at high actives content in fluid medium. It is an object to provide such a process or method wherein the such stability is maintained despite prolonged storage and/or transport time periods, and/or despite being subjected to harsh environmental conditions during such storage and/or transport. It is an object of the present invention to provide such a process or method wherein high densities of pendant —CHOHCHO functionality may be easily achievable on the polymer without significant loss of such stability at high actives content. It is an object of the present invention to provide such a process or method wherein resin polymers of high molecular weight can be prepared without significant loss of such stability at high actives content. The object of the present invention is also to so provide a strength resin polymer that has excellent wet strength improvement properties together with the property of providing high wet strength to dry strength ratios. It is also an object of the present invention to provide such a resin polymer that provides an at least partially reversable wet strength. It is an object of the present invention to provide a strength resin polymer having a high density of bonding sites. It is an object of the present invention to provide a strength resin polymer having a high molecular weight. It is also an object to provide a paper composition containing such strength resin polymers. These and other objects of the present invention are described in more detail below.

DISCLOSURE OF THE INVENTION

The present invention provides a process or method for preparing a strength resin polymer comprising adducting a pendant amide containing polymer with an acetal-aldehyde under alkaline conditions. The present invention also provides a process or method for preparing a strength resin polymer comprising adducting an ethylenically unsaturated monomer with an acetal-aldehyde under alkaline conditions, and then polymerizing such adducted monomer. The present invention provides a strength resin polymer having pendant alpha-hydroxy acetal substituents, which upon activation, preferably at the site of use, release free pendant aldehyde, possibly together with hemiacetal, functionalities. The present invention provides a papermaking process which includes the steps of activating such strength resin polymer and adding a sufficient amount thereof to improve the strength of the paper product.

The present invention also provides such strength resin polymers having high densities of such bonding sites and paper compositions containing same. The present invention further provides such strength resin polymers having high molecular weights and paper compositions containing same.

These embodiments of the invention, and the advantages thereof, are described in more detail below.

PREFERRED EMBODIMENTS OF THE INVENTION

The strength of paper products is a property having three categories, referred to as dry strength, wet strength or rewetted strength, and wet web strength. Dry strength is the tensile strength exhibited by the dry paper sheet, typically conditioned under uniform humidity and room temperature conditions prior to testing. Wet strength, or rewetted strength, is the tensile strength exhibited by a paper sheet that has been fully dried and then rewetted with water prior to testing. Wet web strength is strength of a cellulosic fiber mat prior to drying to a paper product, which mat has a water content of from about 40 to 80 weight percent. Unless explicitly indicated otherwise, the term "wet strength" as used herein refers to rewetted strength.

Cellulosic fibers tend to bond to each other when an aqueous suspension of such fibers is dewatered, as is done during the paper sheet formation step of the papermaking process. This fiber bonding upon dewatering phenomenon is due to the large number of hydrogen bonds that form between fiber surfaces which are in close contact during dewatering. The bonding capability of cellulosic fibers is enhanced by the mechanical beating or refining step(s) of the papermaking process, during which the fibers are made more flexible and the available surface area is increased. The use of additives that increase dry strength reduce the amount of refining required to achieve a given dry strength for a given pulp, and the corresponding energy consumption required for refining. Dry-strength additives generally work by supplementing the number of interfiber hydrogen bonds. Dry strength additives generally are polymeric substances that have groups available for hydrogen bonding, such as polysaccharides that have hydroxyl groups available for hydrogen bonding, and polyacrylamides that can hydrogen bond through the amide group.

The interfiber hydrogen bonding, regardless of whether or not enhanced by the use of dry-strength additives, is reversible upon the rewetting of the fiber mat. Hence paper that has not been treated with any strength resin will lose most of its strength when wetted. Paper treated with an additive that generally only enhances the hydrogen bonding will also have a significantly lower strength when wet, in comparison to its strength when dry.

Improvement in wet strength is dependent on forming interfiber bonds that are less susceptible to reversion upon wetting than hydrogen bonds, such as covalent crosslinking reactions. The formation of interfiber covalent bonds will increase both wet strength and dry strength.

WET STRENGTH/DRY STRENGTH RATIO

A high wet strength to dry strength ratio is very desirable in paper products that are commonly wetted when used, particularly when the paper product preferably should feel soft in dry form. Such products include, without limitation, tissue papers, paper towels and the like. For such paper products, it is desirable to employ a strength resin that provides increased wet strength to the product without a concomitant proportional increase in dry strength. An untreated paper product generally will lose from about 94 to about 98% of its strength when rewetted. An untreated paper that loses 95% of its strength upon wetting has a wet strength to dry strength ratio, as a percentage, of 5%. If a strength additive does not substantially increase that ratio, many paper products produced therewith will either have an insufficient wet strength or an excessively high dry strength, given the additive dosage chosen, and a compromise between wet strength and dry strength will be in fact a compromise to both properties. While an increase in dry strength will almost invariably be seen when the wet strength of paper products is increased, it is desirable for many products that the increase in dry strength be proportionally less than the increase in wet strength, or in other words that the wet strength to dry strength ratio be substantially higher than the 2 to 6% ratios seen in untreated paper. Such products include disposal paper products such as tissues, paper towels, paper napkins and the like, which are designed to be used at least at times wet, and when used are handled by the consumer. Such paper products should not feel unduly harsh, and should remain flexible and pliable.

Cellulose is the fundamental constituent of wood. It is a natural carbohydrate high polymer (polysaccharide) consisting of anhydroglucose units joined by an oxygen likage to form long molecular chains that are essentially linear. The degree of polymerization for wood pulp is about 1000, giving it a molecular weight of about 160,000. The pendant functionalities of the cellulose polymer are hydroxyl and methylol (—CH₂OH).

The strength resin of the present invention in activated form is a polymer that contains pendant alpha-hydroxy aldehyde substituents to pendant amide nitrogen, and possibly some pendant alpha-hydroxy hemiacetal substituents. It is believed that such pendant functionality provides covalent bonding between the strength resin and the celluosic fibers through a hemiacetal formation or similar type of reaction, although the present invention is not limited to any specific type of reaction theory. Hemiacetals and acetals are products of the addition of alcohols to aldehydes, the hemiacetal formation being catalyzed by both acids and bases, while the acetal formation is catalyzed only by acids. In an aqueous medium, an equilibrium exists between reactants and hemiacetal, and/or acetal product in the presence of the required acid catalyst.

Pendant aldehydic functionality in a polymer creates cross-linking problems upon transport and/or storage, particularly if such polymer is held in an aqueous medium during transport and/or storage, due to the reactivity of the aldehydic carbonyl. Not only does such carbonyl comparatively readily react with alcohol functionality, it can react with another aldehydic carbonyl, with amines, and the like. The present invention provides a strength resin polymer that contains pendant acetal functionality. Such acetal functionality is stable in an alkaline environment. This resin polymer contains mer units of the Formula I as follows:

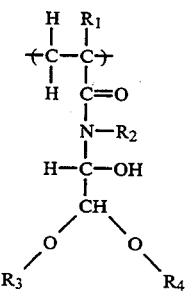

Formula I wherein: $R_1$ is hydrogen, methyl or ethyl; $R_2$ is hydrogen, methyl, or ethyl; and $R_3$ and $R_4$ are either each independently an alkyl having from 1 to about 5 carbons or together contain from about 2 to about 10 carbons and form a cyclic acetal (a heterocyclic ring structure) together with the —O—CH—O— group.

The mer unit depicted by Formula I above is an N-substituted acrylamide, or methacrylamide or ethacrylamide, depending on whether $R_1$ is hydrogen or methyl or ethyl. The term (meth)acrylamide as used herein means either acrylamide or methacrylamide or combinations or mixtures of both. The term ($C_{1-2}$ alkyl)acrylamide as used herein means acrylamide, methacrylamide or ethacrylamide, or combinations or mixtures of two or more of these.

When $R_3$ and $R_4$ are each independently an alkyl having from 1 to about 5 carbons, they may be the same, forming for instance a dimethyl acetal, diethyl acetal, dipropyl acetal, dibutyl acetal, or dipentyl acetal, and the alkyls such as propyl, butyl and pentyl may be the same or different isomers, such as n-propyl, isopropyl, n-butyl, isobutyl, t-butyl, n-pentyl and the various branched carbon chain isomers thereof, or they may be alkyls differing as to the number of carbons or different isomers having the same number of carbons, and mixtures or combinations thereof.

When $R_3$ and $R_4$ together contain from 2 to about 10 carbons and form a cyclic acetal together with the —O—CH—O— group, such cyclic acetal group may have the structural formula of Formula V or Formula VI as follows:

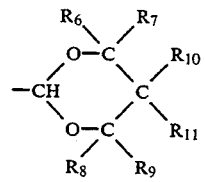

Formula V

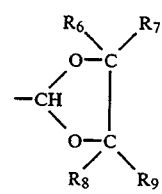

Formula VI wherein $R_6$, $R_7$, $R_8$, $R_9$, $R_{10}$ and $R_{11}$ are separately and independently hydrogen, methyl or ethyl, provided that the total carbons thereof do not exceed 7 for acetal groups of the Formula V and do not exceed 8 for the acetal groups of the Formula VI, because the total combined carbons of such acetal groups do not exceed 10 carbons. Thus the cyclic acetal group can have a variety of structures for instance

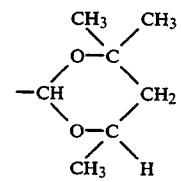

or

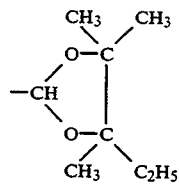

The resin polymer is used in a process which comprises forming an aqueous cellulosic slurry, acidifying an aqueous solution of the resin polymer to hydrolyze it, adding the acidified polymer solution to the cellulosic slurry in an amount sufficient to improve the wet strength of a paper product formed therefrom, forming a cellulosic mat from the resin polymer containing slurry, and drying such mat to form a paper product therefrom. The acidification of the aqueous solution of the resin polymer hydrolyzes at least a portion of the polymer's pendant acetal functionality, releasing, and thus activating, the aldehydic functionality, and possibly some hemiacetal functionality.

The resin polymer is prepared from an (N-alkyl) ($C_{1-2}$ alkyl)acrylamide containing polymer by adduction with an acetal-aldehyde at the site of the amide nitrogen. The ($C_{1-2}$ alkyl)acrylamide amide is a primary amide when $R_2$ of Formula I above is hydrogen, and is a secondary amide when $R_2$ of Formula I above is methyl or ethyl. The adduction reaction should be carried out under alkaline conditions, and the acetal-containing product polymer should remain under alkaline conditions during storage and/or transport.

The acetal-aldehyde reactant may be dimethoxyethanal which has the structural formula of Formula II as follows:

     Formula II

Dimethoxyethanal is a reactant that is commercially available from Hoechst-Cellanese. The mer units adducted with dimethoxyethanal have the structure of Formula I above wherein both $R_4$ and $R_5$ are methyl. The hydrolysis of such an acetal adduct yields as a by-product two moles of methanol for each mole of adducted mer unit.

Other possible acetal-aldehyde reactants include those of structural Formula III as follows:

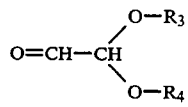     Formula III wherein $R_3$ and $R_4$ are as defined above for Formula I.

The adduction of a preformed (meth)acrylamide polymer is a preferred embodiment of the invention. (Meth)acrylamide polymers are readily synthesized at most any desired molecular weight and in combination with a wide variety of comonomers, from commercially available monomers, by polymerization techniques well known in the polymer field. Further, a wide variety of (meth)acrylamide polymers are available commercially, and such polymers can be readily purchased at most any desired molecular weight and in combination with a wide variety of comonomers. (Meth)acrylamide polymers are employed in numerous industrial applications, which is one reason they are so widely available at relatively modest costs. The adduction of such a preformed polymer proceeds efficiently, and thus preparation of the resin polymer of the present invention by adduction of a preformed polymer reactant with acetal-aldehyde is generally more cost efficient than synthesis of the polymer from acetal-containing monomer(s).

The present invention does not, however, exclude as an alternative the adduction of a ($C_{1-2}$ alkyl)acrylamide monomer with an acetal-aldehyde under alkaline conditions, followed by the syntheis of the resin polymer from such adducted monomer, together with any desired comonomer(s).

By alkaline conditions is meant herein a pH of from about 7.5 to about 14, and preferably from about 8.0, or 8.5 to about 12.0 or about 12.5.

Strength resin polymers, like many other water soluble or water dispersible polymers intended for use in aqueous systems, are advantageously supplied in aqueous solution or dispersion form. Such polymers are routinely synthesized in aqueous medium, and thus storage and transport of such polymers in aqueous medium avoids the additional processing, and costs and energy consumption attendant thereon, which would be required to isolate such polymers for dry storage and transport. If such polymers are stored and transported in dry form for any reason, such as polymer instability in aqueous medium or synthesis in a nonaqueous medium, further additional processing at the site of use is routinely required to dissolve or disperse the polymers prior to charging them to desired system. (Seldom would a polymer of any significant molecular weight be added dry directly to an aqueous industrial system.)

It is highly desirable to store and/or transport aqueous solutions or dispersions of polymers at reasonably high polymer concentrations. High actives products minimize the expense, the required labor and the energy consumption attendant upon storage and/or shipping the material. Such solution or dispersion should, however, be fluid at the actives concentration employed for storage and/or shipping. Thus a polymer that provides solutions or dispersions of reasonable viscosity at relatively high polymer solids concentrations is highly advantageous.

The acetal-containing resin polymer of the present invention is highly advantageous because it provides solutions or dispersion of reasonable viscosity at relatively high polymer solids concentrations. Although nothing would preclude lower solids solutions, an advantage of the present invention is that the acetal-containing polymer may be prepared, stored and transported as a solution containing 10 weight percent polymer solids, or higher, for instance 15 or 20 or higher. For a typical molecular weight, for instance an acetal containing polymer of the present invention with a molecular weight within the range of from about 1,000 to about 200,000, aqueous solutions thereof at solids concentrations in excess of 20 weight percent, are fluid and can be stored for extended time periods, and transported to the site of use, under ambient environmental conditions, without any product deterioration from polymer crosslinking. Such high solids solutions are believed to have shelf-lives of months, and even years.

The acetal-containing resin polymer of the present invention is also highly advantageous because the alkaline conditions, under which it is stable, even at high polymer solids, and despite the environmental conditions encountered during storage and/or transport, are easy to maintain. In contrast, polymers that contain free aldehydic functionality have gelation problems when stored and/or shipped in aqueous medium.

In preferred embodiment, the resin polymer of the present invention has a high degree of adduction with the acetal-aldehyde, which in turn provides a use-activated polymer having a high aldehyde functionality density. This higher degree of adduction has been surprisingly found to improve the wet strength improvement properties of the activated form of the polymer, while the dry strength improvement properties of the activated form of the polymer are maintained or possibly even decreased. This phenomenon is demonstrated by the ratio of wet strength to dry strength provided by the polymer of the present invention, particularly those preferred embodiments that provide activated polymers having high aldehydic densities. The present invention provides, upon activation of the aldehydic functionality, a strength additive that provides high wet strength to dry strength ratios, as seen in the following examples. The significance of such ratios, and the advantages of having high ratios, are discussed in detail above.

In contrast, resin polymers formed with pendant aldehyde functionality prior to storage and/or shipping have limitations as to the aldehydic density. It is the aldehydic functionality that creates the gelation problems in aqueous medium discussed above, and demands that aqueous solutions be as dilute as possible to alleviate to some extent such gelation problems. Moreover, the preparation of such resin polymers by reaction with glyoxal in itself appears to have a limitation as to the amount of aldehydic substituent provided, even when a high excess of glyoxal reactant is employed. In addition, such polymers in commercially-practical, and commercially available, form have very low wet strength to dry strength ratios.

An at least partial reversal of a paper product's wet strength, upon extended exposure to an aqueous medium, together with a high degree of wet strength performance during the normal period of use, is a highly desirable property for many paper products. Such loss of wet strength upon extended exposure to aqueous mediums promotes disintegration of the paper product in aqueous systems, such as septic systems. This time-dependent wet strength reversibility is also advantageous to the repulping of spoiled paper, or broke. When broke is repulped, an at least partial reversibility of the wet strength will reduce the time and energy consumption of the repulping process. Paper products which are routinely used wet, such as paper towels and tissues, generally have a rather short use time, and a time dependent reversal of wet strength will not interfere with wet strength properties during the use of the product. Further, a time dependent reversal of wet strength is an advantageous property for paper products intended for use in the dry state, and hence the present invention is advantageous for such products whenever a covalent-bonding strength resin is desired.

The strength resin polymer of the present invention, when activated, has pendant aldehyde groups, and at times pendant amide groups, and hence is believed to develop wet strength through hemiacetal bond formation between the resin's aldehyde groups and the cellulose's hydroxyl groups. To the extent that the activated polymer has pendant amide groups, a wet strength development contribution by way of amidol bonds between primary amide and aldehyde groups of the polymer is expected. As noted above, hemiacetal bonds decay in neutral aqueous environments. Moreover, such bonds are in equilibrium with the aldehyde and hydroxyl reactants in acid or alkaline aqueous medium, and the presence of a quantity of water will drive the equilibrium away from hemiacetal bonding.

In preferred embodiment, the polymer of the present invention includes ionic mer units. Such ionic mer units may be anionic mer units such as acrylic acid, methacrylic acid, maleic acid, crotonic acid, vinyl sulfonate, styrene sulfonate, acrylamidopropane sulfonic acid, or other N-substituted alkyl sulfonate (meth)acrylamide mer units, and the like, or mer units that are converted to anionic mer units under the use conditions of the present invention, for instance the by hydrolysis, such as the various esters of the above carboxylic acid containing mer units or (meth)acrylamide, which may be at least partially hydrolize to (meth)acrylic acid.

In more preferred embodiment the ionic mer units of the present polymer, or at least the predominant ionic mer units thereof, are cationic in nature. Such cationic mer units include diallydimethyl ammonium chloride ("DADMAC"), methacrylamidopropyl trimethyl ammonium chloride ("MAPTAC"), dimethylaminoethyl acrylate "DMAEA"), dimethylaminoethyl methacrylate "DMAEM"), the salts or quaternary ammonium salts of dimethylaminoethyl acrylate or dimethylaminoethyl methacrylate, vinyl pyridine, quaternized 2-aminoethyl (meth)acrylate, quaternized diaminoethyl (meth)acrylate, trimethylvinylbenzyl ammonium chloride and the like.

Strength resin polymers commonly include not only mer units that provide hydrogen, or covalent, bonds that develop the strength property, but also comonomers that increase the substantivity of the polymer to cellulose fibers, such as the ionic comonomers noted above. A polymer that has as its only ionic mer unit one or more of the various anionic mer units, for instance acrylic acid, is of course not alone substantive to the negative cellulose fibers, and hence requires the course of aluminum sulfate under controlled pH conditions or an equivalent substantivity-providing pulp treatment. When cationic substituents are incorporated into the polymer to provide a cationic charge thereto, the polymer is directly substantive to anionic pulp fibers. Such cationic polymers have little to no dependence on alum or like materials, and are effective over a broad pH range. Some cationic charge may be provided by mer units having amine functionality, with primary amines providing the weakest bases and quaternary amine salts providing the strongest cationic charge. Polymers that contain quaternary amines also retain their cationic charge over a wider pH range than do the less substituted amines.

The present invention does not exclude the incorporation of both anionic and cationic mer units in the strength resin polymer, and hence does not exclude amphoteric polymers, provided that both types of ionic mer units are not present in such high densities as to unduly increase the viscosities of aqueous solutions of the polymer or promote an undue amount of polymer cross-linking. When both anionic and cationic mer units are incorporated into the polymer, the charge density of the predominant type preferably should be at least about 10 times greater than the charge density of the other type.

The strength resin polymer may contain other mer units, which preferably are of the type that have no undue deleterious effect on the performance and advantageous characteristics of the resin polymer. Such other comonomers include, without limitation, (meth)acrylamide, N,N-dimethylacrylamide, N-vinyl pyrrolidone, vinyl acetate, styrene, (meth)acrylic esters, particularly such esters formed from alcohols having from about 1 to about 20 carbons, and the like. Acrylamide and/or methacrylamide are among the mer units that may provide the adduction sites for the preparation of the present strength resin polymer, but such mer units are not necessarily present in some degree in the adducted polymer. The strength resin polymer may be comprised wholly of adducted mer units, or at least the mer units subject to adduction may be wholly adducted. The strength resin polymer may be provided with mer units of the (meth)acrylamide type simply by using a stoichiometric excess of such mer units with respect to the amount of acetal-aldehyde consumed during the adduction.

The strength resin polymer of the present invention can be depicted as having the structural formula of Formula IV as follows:

$$(A)_a(X)_b(Y)_c \qquad \text{Formula IV}$$

wherein A represents a mer unit that is adducted with an acetal-aldehyde as described above, X represents an ionic mer unit as described above, and Y represents mer units other than those within the A or X category, as described above as other comonomers. By mer unit is meant herein a segment of the polymer having two adjacent backbone carbons, including groups pendant from such backbone carbons. The A, X and Y mer units may be randomly distributed, or the polymer may be a block polymer or the like, with certain nonrandom arrangements of the mer units. "a" is the mole percentage of mer units within the A category, and is a number within the range of from about 0.1 to about 100, and hence the resin polymer may have as little as 0.1 mole percent of the adducted mer units, and may be comprised wholly of such adducted mer units. "b" is the mole percentage of mer units within the X category, and is a number within the range of from about 0 to about 50, and hence the resin polymer may have no ionic mer units, or it may have as much as about 50 mole percent of ionic mer units. "c" is the mole percentage of mer units within the Y category of mer units, and is a number from about 0 to about 99.9, and hence the resin polymer may have no nonionic, nonadducted mer units, or it may be comprised of as much as about 99.9 mole percent of such type of mer units. As noted above, certain mer units may be converted from nonionic to ionic when the resin polymer is activated by hydrolysis. Such mer units may include (meth)acrylamide and (meth)acrylate esters. Unless expressly indicated otherwise, the mole percentage of a given category of mer units refers to the state such mer unit exists in prior to the activation of the polymer by hydrolysis. Hence for instance an ester of acrylic acid is deemed within category Y when present in the resin polymer prior to activation, regardless of whether some or all of such ester hydrolyzes to acrylic acid upon activation.

In one preferred embodiment, "a" is from about 1 to about 80, and more preferably from about 10, or even 20, to about 50, or 60. In such preferred embodiment there is provided a significant mole percentage of the adducted mer unit, which is activated to the active pendant aldehyde for wet strength development, while the polymer maintains available mer unit space for nonadducted mer units which may be desired for any reason. For instance, (meth)acrylamide mer units contain a primary amine function, and hence may be desired for that function's contribution to the development of dry strength. Ionic mer units may be desired for their contribution to the polymer's substantivity to the cellulosic fibers. Other mer units may be desired for other various purposes. In another preferred embodiment, "a" is from about 15, or 20, to about 80, or 100, and in this preferred embodiment the higher levels of adduction are provided. In another preferred embodiment, b is from about 0, or 0.1, to about 25, or 30, and more preferably from about 1 to about 10, or 15. Such embodiments provide levels of ionic mer units suitable for providing the at times ionic contribution to substantivity to cellulose. In another preferred embodiment, c is from about 0 to about 80, or 90, and more preferably c is from about 1, or 5, to about 75, or 80.

The resin polymer of the present invention may be used, after activation, in any amount effective for wet strength improvement. It is believed that such dosage levels will range from about 1 to about 35, or 40, pounds of the activated polymer actives per dry ton of fiber in the cellulosic slurry to which it is added, and most commonly from about 10 to about 25 pounds, same basis.

At times it is desired to use very high molecular weight polymers for strength development, although in standard paper formulations, such as that used in the following examples and comparative examples, lower molecular weight polymers perform better. Such high molecular weight polymers may have molecular weights in excess of 1,000,000, for instance 2,000,000, or 5,000,000, or even 10,000,000 or higher. Such polymers commonly are water soluble, or water miscible to the extent of providing a fluid system, only at rather dilute concentrations. To avoid excessive water requirements for the preparation and/or shipping of such polymers, these polymers are commonly synthesized as latices or emulsions having a continuous oil phase (oil external latex or water in oil, "w/o" emulsions). The active polymer of such latices is substantially held in the dispersed phase with some amount of water in which the polymer is to a degree solubilized. When such w/o emulsion is to be added to an aqueous system, the emulsion is inverted in the presence of additional water, routinely with agitation, and an aqueous solution of polymer is generally quickly formed.

Gelation of such high molecular weight polymers can occur with undesirable frequency when the polymer, or any residual reactant in the medium holding the polymer during storage and/or transport, contains potential crosslinking agent(s). Gelation of such high molecular weight polymers is a serious problem and a deterrent to their use even when desired. Moreover, the conditions encountered during storage and/or shipment of such a polymer often aggravate the gelation problem, promoting such polymer crosslinking. The formation of the strength resin polymer of the present invention without adding thereto any sites of potential crosslinking, and without including in the polymer medium any residual cross-linking agent, is particularly advantageous when the resin polymer is of high molecular weight.

The strength resin polymer of the present invention may have a molecular weight from about 1,000 to about 30,000,000. The selection of polymer molecular weight is at least in part dependent on molecular weight preference for strength development in a given papermaking formulation and, as discussed above, while lower molecular weight resin polymers seem to have performance advantages when used in typical papermaking stock formulations, in the industrial papermaking field there are instances in which high molecular weight resin polymers are preferred. The molecular weight of a given type of polymer does effect its water solubility and/or water dispersibility characteristics, but the low use levels of the activated form of the present polymer, the known techniques employing an oil continuous medium for high molecular weight polymers that are water soluble in fluid systems only at low concentrations, and the potential for incorporating water solubility promoting met units in the polymer alleviate most any molecular weight problem as to the present invention. As demonstrated in Example 6 below, a high molecular weight polymer prepared in an oil continuous latex form can be adducted without any deleterious effect on such latex, and thereafter inverted to release the adducted polymer to an aqueous medium, and hydrolyzed to release the active aldehyde functionality. As is also shown in Example 6, the inversion and hydrolysis can be done in a single step at or near the site of use. Nonetheless, given the more common preference for lower molecular weight strength resin polymers, the polymer of the present invention would most commonly have a molecular weight of from about 1000, or even 5000, to about 500,000, or even 1,000,000. Nonetheless the resin polymer of the present invention may have any molecular weight that is effective in providing wet strength improvement, and in certain preferred embodiments the resin polymer is one having a molecular weight in excess of 1,000,000, and in excess of 5,000,000.

Strength resin precursors comprised of polymers having pendant acetal groups, and the hydrolysis of such precursors prior to use, are known from U.S. Pat. Nos. 4,508,594 and 4,605,718, Jansma et al. As described therein, such polymers are derived from acetal-containing vinyl monomers. The production of such monomeric starting materials is both difficult and costly. Such monomers are not commercially available at a reasonable cost.

The terms paper or paper products, as used herein, include any cellulose containing mat or web or sheet which is prepared by screening a dilute cellulose fiber suspension in water, which may or may not contain other fibrous matter such as rayon, nylon, glass fiber and the like. Thus paper and paper products refer also to non-woven fabrics, roofing felt, molded products such as egg cartons, ceiling tile and the like. Advantages ensue from the present invention for paper and paper products generally. The use of the present invention for paper products intended to be used wet, such as paper towels, napkins, tissues and the like is of course a preferred embodiment of the invention.

COMPARATIVE EXAMPLE 1

The performance of the present invention was demonstrated in comparison to the following preparation and strength testing of an untreated paper. A 50/50 by weight mixture of bleached softwood kraft pulp and bleached hardwood kraft pulp (dry lap) was fiberized in a British disintegrator for 10 minutes at 1.2 percent consistency. The Canadian Standard Freeness of the resulting pulp mixture was approximately 700 ml. A portion of this stock was then diluted to 0.3 percent consistency and adjusted to a pH of approximately 6. Handsheets were then formed from this stock on a Nobel and Wood handsheet former using water at a pH of approximately 6 for the necessary dilution. Targeted basis weight for the handsheets was 60 grams per square meter. The sheets were pressed and then dried on a heated rotary drum dryer. After drying, the sheets were placed for conditioning in a testing room controlled to 23 degress Centigrade and 50 percent relative humidity. After such overnight conditioning, twenty strips were cut from the handsheets. Each of such strips was one inch wide. Ten of these strips were tested for wet tensile strength and ten for dry tensile strength using an Instron brand tester. The dry-strength-tested sheets were of course tested "as is". The wet-strength-tested strips were first mounted in the jaws of the test apparatus and then the centers thereof were wetted with water which was applied with a brush. The tensile strength tests were commenced 10 seconds after such wettings. The values set forth in Table 1 below are averages of the ten samples used for each type of test.

TABLE 1

| Parameter | Value |
| --- | --- |
| Wet Strength Tensile Index | 0.670 Newton-meters/gram |

TABLE 1-continued

| Parameter | Value |
| --- | --- |
| Dry Strength Tensile Index | 11.25 Newton-meters/gram |

EXAMPLE 2

An acrylamide polymer was adducted to provide pendant acetal groups, and then hydrolyzed to provide pendant aldehyde functionalities, as follows. The polymer was comprised of 95 mole percent of acrylamide and 5 mole percent of DADMAC mer units and had an intrinsic viscosity ("IV") of 1.06 dl/gram. It was dissolved in water at a weight concentration of 20 percent. 33.15 grams of this polymer solution was admixed with: 2.00 grams of a 20 wt. % $Na_3PO_4.H_2O$ aqueous solution; 2.00 grams of a 10 wt. % sodium hydroxide aqueous solution; and 11.10 grams of water. This admixture was a solution having a pH of 10.0. To this solution was added 8.75 grams of a 50 wt. % aqueous solution of dimethoxyethanal with stirring, and the temperature of the resulting solution was held at 100° F. for a 40 hour period of time. The solution was stirred at the time of the dimethoxyethanal addition and throughout the 40 hour period. The polymer in the resulting solution was determined to have been efficiently derivatized to a pendant acetal polymer; nuclear magnetic resonance spectroscopy analysis of the solution indicated that approximately 62 percent of the dimethoxyethanal charged had reacted with the polymer to form pendant acetal groups. Then 7.08 grams of this resultant polymer solution was admixed to 64.17 grams of water and 3.75 grams of a 2.5N hydrochloric acid solution. The temperature of this acidified solution was then held at 100° F. for a 20 hour period of time prior to its use as a strength additive.

EXAMPLE 3

The polymer prepared as described above in Example 2 was employed as a strength additive immediately after the 20 hour hydrolysis period as follows. The polymer, in the preparation solution, was added to a 0.3 percent consistency fiber slurry, which slurry was prepared as described in Comparative Example 1 above. The addition level was the equivalent of 20 pounds of hydrolyzed polymer actives per dry ton of fiber in the slurry. The amount of polymer solution required for such additive level was calculated based on two assumptions. First, it was assumed for the purposes of calculating the dosage that reaction between the dimethoxyethanal and polymer to form pendant acetal groups ultimately continued to completion. Second, it was assumed that during the 20 hour hydrolysis period all of the acetal groups were hydrolyzed. Then handsheets were formed and conditioned, and sample strips therefrom were cut and tested for dry and wet strength, all as described above in Comparative Example 1. The results of such tests are set forth in Table 2 below.

TABLE 2

| Parameter | Value |
| --- | --- |
| Wet Strength Tensile Index | 7.130 Newton-meters/gram |
| Dry Strength Tensile Index | 24.58 Newton-meters/gram |

EXAMPLE 4

An acrylamide polymer was adducted to provide pendant acetal groups, and then hydrolyzed to provide pendant aldehyde functionalities, as follows. The polymer starting material was the same 20 wt. % aqueous solution of a 95 mole percent acrylamide polymer. 100 grams of this polymer solution was admixed with 6.0 grams of a 20 wt. % $Na_3PO_4.H_2O$ aqueous solution and 4.0 grams of a 10 wt. percent sodium hydroxide solution. This admixture was a solution having a pH of 10.2. A 25 gram aliquot of this solution was admixed with 12.0 grams of a 50 wt. % aqueous solution of dimethoxyethanal, and the resulting solution was held at 100° F. for a 50 hour time period. Immediately after this 50 hour reaction period, 7.03 grams of the resultant polymer solution was admixed with 87.97 grams of water and 5.00 grams of 2.5N hydrochloric acid solution. The temperature of this acidified solution was then held at 100° F. for an 18 hour hydrolysis time period prior to its use as a strength additive.

EXAMPLE 5

Example 3 was repeated except that the polymer used as the strength additive was that prepared as described in Example 4 above. The addition level of the polymer was again equivalent to 20 pounds of hydrolyzed polymer actives per dry ton of fiber in the slurry, and the same assumptions were made when calculating the amount of solution to be added to provide such additive level. The results of testing of the handsheet strips are set forth below in Table 3.

TABLE 3

| Parameter | Value |
| --- | --- |
| Wet Tensile Index | 7.58 Newton-meters/gram |
| Dry Tensile Index | 25.07 Newton-meters/gram |

EXAMPLE 6

A high molecular weight acrylamide polymer in the form of an oil continuous latex, as described generally elsewhere herein, was adducted to provide pendant acetal groups, and then hydrolyzed to provide pendant aldehyde functionalities, as follows. The polymer was an acrylamide/methacrylamidopropyltrimethyl ammonium chloride copolymer having an intrinsic viscosity of 4.43 dl/gram. It was held in an oil continuous emulsion comprised of: 32 wt. % polymer solids; 24.00 wt. percent low odor paraffin solvent; 1.25 wt. % sorbitan mono-oleate surfactant; 1.25 wt. % of other surfactants; and 41.40 wt. percent water. 99.00 grams of this emulsion was admixed with 2.63 grams of $Na_3PO_4.12H_2O$ and 2.67 grams of a 10 wt. % sodium hydroxide aqueous solution. The pH of this resultant mixture was 9.25. To this mixture was added 1.53 grams of a 50 wt. percent aqueous solution of dimethoxyethanal with stirring, and the temperature of the resulting mixture was held at ambient normal room temperature for a 24 hour time period. The polymer in the resulting mixture was determined to have been efficiently derivatized to a pendant acetal polymer; nuclear magnetic resonance spectroscopy analysis indicated that approximately 77 wt. percent of the dimethoxyethanal had reacted with the polymer to form pendant acetal groups. After such 24 hour reaction period, the mixture was inverted and the polymer therein hydrolyzed as follows. 7.53 grams of the polymer-contining mixture was admixed with 134.89 grams of water, 0.08 grams of an ethoxylated nonyl phenol surfactant and 7.50 grams of 2.5N hydrochloric acid solution. After holding this solution at room temperature for a time period of 5 days, it was used as a strength additive as described in Example 3 above, at the same 20 pounds of hydrolyzed polymer actives per dry ton of fiber in the slurry, using the same assumptions in the dosage calculation. The test results for the strips taken from the handsheets prepared are set forth below in Table 4.

TABLE 4

| Parameter | Value |
| --- | --- |
| Wet Tensile Index | 2.976 Newton-meters/gram |
| Dry Tensile Index | 14.26 Newton-meters/gram |

COMPARATIVE EXAMPLE 7

To demonstrate the importance of the acetal hydrolysis to strength performance, an aliquot of the polymer described above in Example 4, after the adduction with dimethoxyethanal, but prior to its hydrolysis with hydrochloric acid, was tested as a strength additive as described in Example 1 above, at an additive level of 20 pounds of additive actives per dry ton of fiber in the slurry. The results of such tests are set forth in Table 4 below.

TABLE 4

| Parameter | Value |
| --- | --- |
| Wet Tensile Index | 0.81 Newton meters/gram |
| Dry Tensile Index | 11.40 Newton meters/gram |

COMPARATIVE EXAMPLE 8

As a comparison, against which the performance of the present invention is also demonstrated, Example 3 was repeated except the strength resin employed was a commercial wet strength resin prepared according to the teachings of U.S. Pat. No. 3,556,932. Such additive was again employed at an additive level of 20 pounds of additive actives per dry ton of fiber in the slurry. The test results of the strips taken from the handsheets made are set forth below in Table 6.

TABLE 6

| Parameter | Value |
| --- | --- |
| Wet Tensile Index | 5.661 Newton-meters/gram |
| Dry Tensile Index | 25.05 Newton-meters/gram |

COMPARATIVE EXAMPLE 9

For another comparison, against which the performance of the present invention is demonstrated, Example 3 was again repeated except the strength resin employed was a commercial wet strength resin believed to be a condensation polymer of adipic acid and diethylenetriamine that was then reacted with epichlorohydrin, and the pH of the slurry and dilution water was adjusted to 7.5. The pH was so modified because such type of resin is known to perform best under alkaline conditions. This additive was again employed at an additive level of 20 pounds of additive actives per dry ton of fiber in the slurry. The test results of the strips taken from the handsheets made are set forth below in Table 7.

TABLE 7

| Parameter | Value |
| --- | --- |
| Wet Tensile Index | 3.227 Newton-meters/gram |
| Dry Tensile Index | 13.86 Newton-meters/gram |

EXAMPLE 10

From the data generated in Examples 3, 5 and 6, and Comparative Examples 1, 7, 8 and 9, the Wet Tensile Index to Dry Tensile Index Ratios and the increases in the dry tensile Indexes (in percentages) over that of untreated paper, that is Example 1, were calculated, and the results are set forth in Table 8 below.

TABLE 8

| Example or Comparative Example | Wet Tensile Index to Dry Tensile Index (as a percentage) | Dry Tensile Index Increase vs Untreated Paper (as a percentage) |
| --- | --- | --- |
| Comparative Example 1 | 6.0% | — |
| Example 3 | 29.0% | 118% |
| Example 5 | 30.2% | 123% |
| Example 6 | 20.9% | 27% |
| Comparative Example 7 | 7.1% | 1% |
| Comparative Example 8 | 22.6% | 123% |
| Comparative Example 9 | 23.3% | 23% |

The papermaking process of the present invention can be conducted under industrial standard conditions as to the consistency of the cellulosic slurry, the pH of the slurry, the drying temperature and the like. The activated resin polymer is added at the wet end of the process, before formation and drying of a mat of cellulosic fiber. The slurry is generally of a consistency of about 0.5 percent or less a the time the fiber mat is formed, and the resin polymer may be added to the slurry when it is at such a consistency or when it is at a higher consistency. In preferred embodiment, the cellulosic slurry is at a consistency of no more than about 3 percent at the time the polymer is charged thereto. The pH of the cellulosic slurry at the time of mat formation may be that normally employed in papermaking processes, which seldom would be less than a pH of about 4, and seldom would be more than a pH of about 8, although a slurry pH of about 6 to about 7 is advantageous in the development of the desired strength properties when employing the activated resin polymer of the present invention. The fiber mat drying temperature may also be that routinely employed in standard papermaking processes, which varies from about 190° to about 250° F., although it is believed that lower temperatures, down to even normal ambient room temperature, is generally sufficient for improving the strength properties of paper products.

In preferred embodiment the papermaking process is one in which the resin polymer, before activation, is of the Formula IV above wherein "a" is a value of at least about 20, and hence the density of acetal substituents is at least about 20 mole percent. In another embodiment, the present invention includes the activated resin polymer resulting from the hydrolysis of such a polymer, which will also have at least 20 mole percent of the activated substituents, and a papermaking composition containing such activated resin polymer in the form that it exists upon bonding and the like with the cellulosic fibers or fines of the slurry.

In another preferred embodiment, the papermaking process is one in which the resin polymer, before activation, has a molecular weight of at least about 1,000,000, and more preferably of at least about 5,000,000. The present invention also includes the activated form of such polymer resin upon the hydrolysis of such a polymer, which preferably will also have a molecular weight of at least about 1,000,000, and more preferably of at least about 5,000,000, and a papermaking composition containing such activated resin polymer in the form that it exists upon bonding and the like with the cellulosic fibers or fines of the slurry.

In another preferred embodiment, the strength resin polymer is in the form of a fluid liquid system having an at least 10, or 15, weight percent concentration of the polymer, and more preferably 20 weight percent or higher. In certain of such preferred embodiments, the resin polymer is the solute of a fluid aqueous polymer solution, and in other of such preferred embodiments the resin polymer is held in the dispersed aqueous phase of a fluid oil-continuous water-in-oil emulsion.

In another preferred embodiment, the strength resin polymer is prepared by adduction of a pre-existing polymer in a liquid system to provide a fluid liquid system as described immediately above, substantially without any further additions. In another preferred embodiment, the strength resin polymer is prepared by adduction of monomer which is then polymerized in a liquid system to provide a fluid liquid system as described above, substantially without further additions.

While the test data set forth above demonstrates the development of dry strength and wet strength in paper products, it is believed that the present invention provides also improvements in wet web strength which is important to the papermaking process.

Unless expressly indicated otherwise herein, any percentage given is a percentage by weight. All molecular weights mentioned herein are weight average molecular weights.

INDUSTRIAL APPLICABILITY OF THE INVENTION

The present invention is applicable to the papermaking industry.

We claim:

1. A papermaking wet-end strength resin polymer that is stable in an alkaline environment and that hydrolyzes upon acidification to form pendent aldehyde functionality comprising:

a water soluble polymer having mer units of the structural formula of

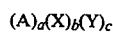

wherein A is an acetal-containing mer unit, X is a cationic mer unit, and
Y is acrylamide.
"a" is the mole percentage of A in said polymer and is a value of from about 1 to about 100, "b" is the mole percentage of X in said polymer and is a value of from about 0 to about 50, and "c" is the mole percentage of Y in said polymer and is a value of from about 0 to about 90,
wherein said acetal-containing mer unit has the structural formula of

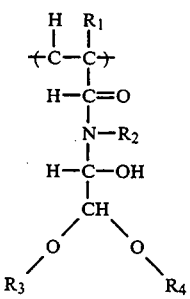

Formula I wherein: $R_1$ is hydrogen, methyl or ethyl; $R_2$ is hydrogen, methyl, or ethyl; and $R_3$ and $R_4$ are either each independently an alkyl having from 1 to about 5 carbons or together contain from about 2 to about 10 carbons and from a cyclic acetal together with the —O—CH—O—group.

2. The strength resin polymer of claim 1 wherein "a" is a value of from about 15 to about 100, "b" is a value of from about 0 to about 30, and "c" is a value of from about 0 to about 90.

3. The polymer of claim 2 wherein "a" is at least about 20.

4. The polymer of claim 2 wherein "b" is from about 1 to about 10.

5. The polymer of claim 1 wherein said polymer has a molecular weight of from about 1,000 to about 30,000,000.

6. The polymer of claim 1 wherein said polymer is in the form of an aqueous solution containing at least 20 weight percent of said polymer;
"a" is at least 15; and, the weight average molecular weight of said polymer is from about 500 to about 200,000.

7. The polymer of claim 1 wherein said polymer is contained in the dispersed aqueous phase of an oil continuous water-in-oil emulsion;
said emulsion containing at least 20 weight percent of said polymer; and,
said polymer has a weight average molecular weight of from about 1,000,000 to about 30,000,000.

8. A process for preparing a papermaking wet-end strength resin polymer that is stable in an alkaline environment and that hydrolyzes upon acidification to form free aldehydic functionality comprising:
admixing a water soluble polymer having acrylamide mer units with an acetal-aldehyde of the formula

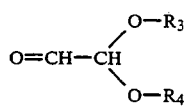

in a aqueous solution or the aqueous phase of a water-in-oil emulsion having a pH of from about 8 to about 12.5 to form acetal-containing polymer of the structural formula $(A)_a(X)_b(Y)_c$ wherein A is an acetal-containing mer unit, X is a cationic mer unit, and
Y is acrylamide,
"a" is the mole percentage of A in said polymer and is a value of from about 1 to about 100, "b" is the mole percentage of X in said polymer and is a value of from about 0 to about 50, and "c" is the mole percentage of Y in said polymer and is a value of from about 0 to about 90 wherein said acetal-containing mer unit has the structural formula of

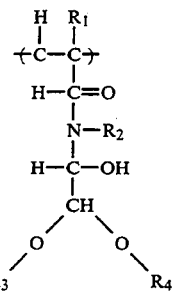

wherein: $R_1$ is hydrogen, methyl or ethyl; $R_2$ is hydrogen, methyl, or ethyl; and $R_3$ and $R_4$ are, in each of said Formulas, either each independently an alkyl having from 1 to about 5 carbons or together contain from about 2 to about 10 carbons and form a cyclic acetal together with the —O—CH—O group 9. A process for preparing a papermaking wet-end strength resin polymer that is stable in an alkaline environment and that hydrolyzes to form pendent aldehydic functionality upon acidification comprising:
admixing in an aqueous solution acrylamide with an acetalaldehyde of the formula:

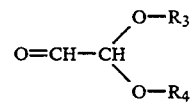

at a pH of from about 8 to about 12.5 to form a modified acrylamide acetal-containing mer unit; and
then polymerizing said modified acrylamide acetal-containing mer unit with a cationic monomer to form a water soluble polymer of the structural formula $(A)_a(X)_b(Y)_c$ wherein A is an acetal-containing mer unit, X is a cationic mer unit, and Y is acrylamide,
"a" is the mole percentage of A in said polymer and is a value of from about 1 to about 100, "b" is the mole percentage of X in said polymer and is a value of from about 0 to about 50, and "c" is the mole percentage of Y in said polymer and is a value of from about 0 to about 90,
wherein said acetal-containing mer unit has the structural formula of

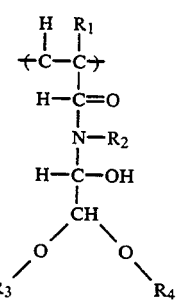

wherein: $R_1$ is hydrogen, methyl or ethyl; $R_2$ is hydrogen, methyl, or ethyl; and $R_3$ and $R_4$ are, in each of said Formulas, either each independently an alkyl having from 1 to about 5 carbons or together contain from about 2 to about 10 carbon and form a cyclic acetal together with the —O—CH—O group.

10. The process of claim 9 wherein said acetal-aldehyde is dimethoxyethanal.

11. The process of claim 8 wherein said aqueous solution or the aqueous phase of a water-in-oil emulsion is an aqueous solution, and said acetal-containing polymer is formed in said aqueous solution in the amount of at least 20 weight percent of said aqueous solution, "a" is at least 15 and the weight average molecular weight of said polymer is from about 500 to about 200,000.

12. The process of claim 8 wherein fluid system is an oilcontinuous water-in-oil emulsion, said polymer containing mer units of acrylamide is contained in the dispersed aqueous phase of said water-in-oil emulsion, the acetal-containing polymer formed comprises at least 20 weight percent of said water-in-oil emulsion and has a weight average molecular weight of at least 1,000,000.

13. A papermaking wet-end strength resin polymer that is stable in an alkaline environment and that hydrolyzes upon acidification to form pendent aldehyde groups characterized by mer units having the structural formula of:

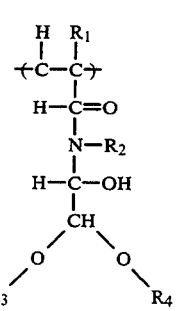

wherein $R_1$ is hydrogen, methyl or ethyl; $R_2$ is hydrogen, methyl, or ethyl; and $R_3$ and $R_4$ are either each independently an alkyl having from 1 to about 5 carbons or together contain from about 2 to about 10 carbons and form a cyclic acetal together with the —O—CH—O—group.

wherein said water soluble polymer has the structural formula of

wherein A is a mer unit of said Formula I, X is an ionic mer unit, and Y is a mer unit other than A or X, "a" is the mole percentage of A in said polymer and is a value of from about 15 to about 60, "b" is the mole percentage of X in said polymer and is a value of from about 0 to about 50, and "c" is the mole percentage of Y in said polymer and is a value of from about 1 to about 80.

* * * * *